US009160645B2

(12) United States Patent
Worrall

(10) Patent No.: US 9,160,645 B2
(45) Date of Patent: Oct. 13, 2015

(54) METHODS AND SYSTEMS FOR NETWORK PERFORMANCE MEASUREMENT USING VERIFIABLE SINGLE-USE HIGHLY-ENTROPIC FILE GENERATION

(71) Applicant: CELLCO PARTNERSHIP, Basking Ridge, NJ (US)

(72) Inventor: Robert Worrall, Annandale, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 313 days.

(21) Appl. No.: 13/717,020

(22) Filed: Dec. 17, 2012

(65) Prior Publication Data

US 2014/0169190 A1 Jun. 19, 2014

(51) Int. Cl.
*G01R 31/08* (2006.01)
*H04L 12/26* (2006.01)
*H04W 24/00* (2009.01)

(52) U.S. Cl.
CPC ............... *H04L 43/50* (2013.01); *H04W 24/00* (2013.01); *H04L 12/2697* (2013.01)

(58) Field of Classification Search
CPC . H04L 12/2602; H04L 12/2697; H04L 43/50; H04L 43/00; H04L 12/5601; H04L 9/0631; H04L 9/14; H04L 9/0662; H04L 41/046; H04L 43/0829; H04L 43/0864; H04L 29/0604; H04L 29/06; H04L 69/04; H04L 12/285; H04W 88/085; G06F 11/2294
See application file for complete search history.

(56) References Cited

U.S. PATENT DOCUMENTS

| | | | | |
|---|---|---|---|---|
| 6,510,156 | B1 * | 1/2003 | Brock et al. | 370/395.1 |
| 7,222,255 | B1 * | 5/2007 | Claessens et al. | 714/4.12 |
| 8,775,663 | B1 * | 7/2014 | Singh | 709/232 |
| 2003/0046383 | A1 * | 3/2003 | Lee et al. | 709/224 |
| 2004/0107298 | A1 * | 6/2004 | Westphal | 709/247 |
| 2008/0117831 | A1 * | 5/2008 | Nielsen | 370/252 |
| 2008/0256019 | A1 * | 10/2008 | Alpern et al. | 707/1 |
| 2009/0040942 | A1 * | 2/2009 | Yang | 370/253 |
| 2009/0179071 | A1 * | 7/2009 | Backert et al. | 235/51 |
| 2011/0055634 | A1 * | 3/2011 | Huang | 714/32 |
| 2011/0317568 | A1 * | 12/2011 | Flinta et al. | 370/252 |
| 2012/0063345 | A1 * | 3/2012 | Krzanowski et al. | 370/252 |
| 2012/0063592 | A1 * | 3/2012 | Spalka et al. | 380/28 |
| 2013/0074185 | A1 * | 3/2013 | McDougal et al. | 726/24 |
| 2013/0136068 | A1 * | 5/2013 | Johansson et al. | 370/329 |

* cited by examiner

*Primary Examiner* — Bob Phunkulh

(57) ABSTRACT

A network performance measurement relies on the transmission of a verifiable, single-use, highly-entropic file across the network. Upon receiving a network performance measurement query from a user equipment (UE) device communicating through a mobile communication network, a test utility (TU) server generates a test file having high entropy such that it does not reduce substantially in size when compressed using standard compression algorithms. The test file is assigned a filename including a variable component, and the file is transmitted to the UE device. Information relating to the transmission of the test file is logged, and a network performance measurement value for the transport of the high-entropy test file to the UE device is computed based on the logged information. In one example, hash-value computations are used to verify that the test file received in the UE device is complete and accurate.

22 Claims, 5 Drawing Sheets

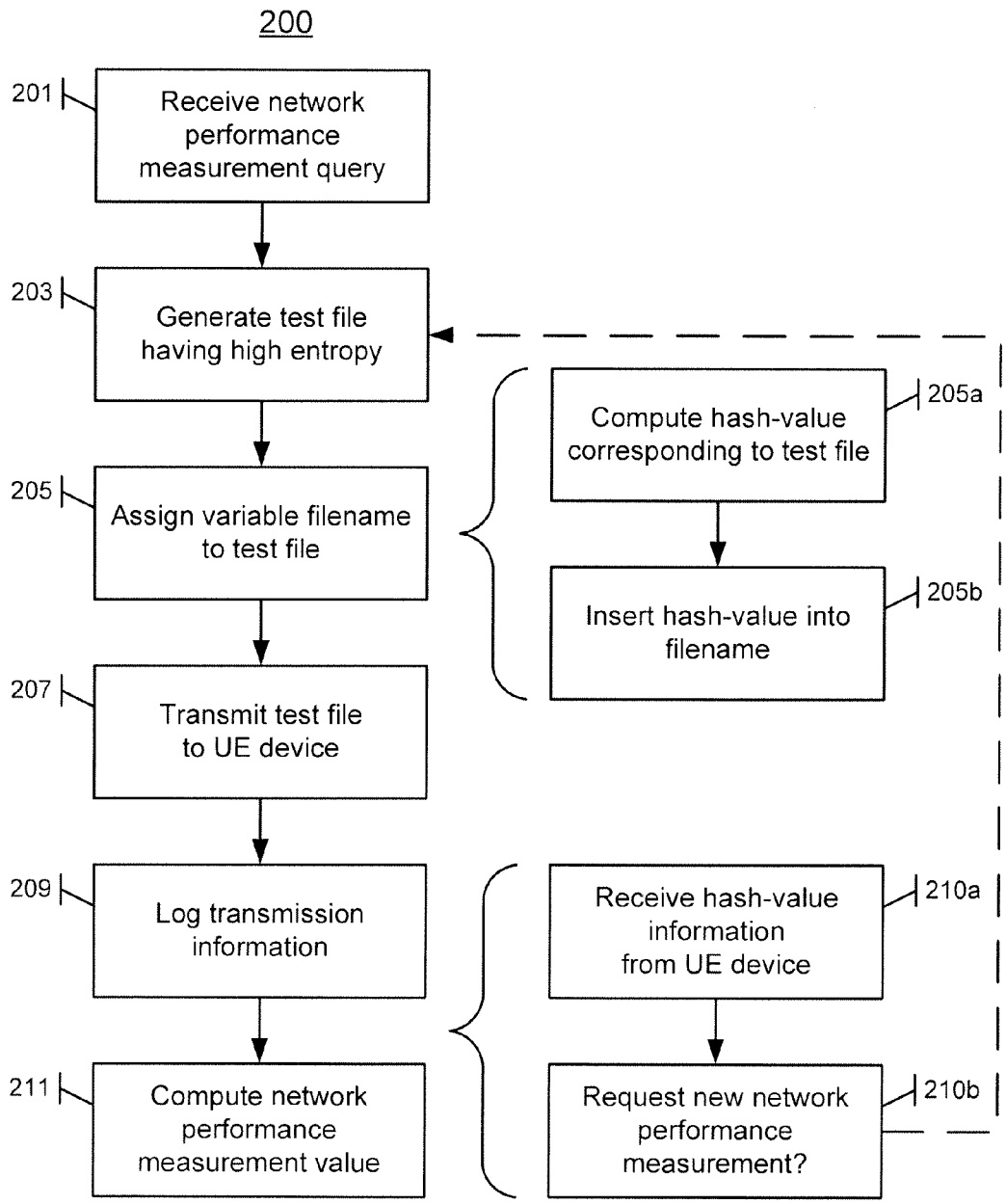

METHODS AND SYSTEMS FOR NETWORK PERFORMANCE MEASUREMENT USING VERIFIABLE SINGLE-USE HIGHLY-ENTROPIC FILE GENERATION

BACKGROUND

Mobile communication services are expanding and increasing in popularity around the world. Many advanced networks offer wireless mobile communication service for voice calls, mobile messaging services (e.g., text and/or multimedia) and data communications. The data services, for example, enable surfing the world wide web via a browser or downloading files or applications from third party web servers. Data services may also support real-time streaming of audio, video, or other multimedia content.

Variations in network performance can significantly impact a user's perception of the quality of the data service that the network offers, and thus impact subscriber satisfaction. A network carrier's ability to accurately measure a network's performance, an improvement in a network's performance in response to an upgrade in equipment or protocols, and/or to measure other carriers' networks' performances, may provide the carrier with a competitive advantage over competitors.

The measurement of a mobile communication network's transport layer capabilities, such as the measurement of the network's data transfer rate (i.e., network speed, or network bandwidth), can be affected by the network's automatic caching of content and the network's compression of content. For example, in measuring the network's data transfer rate, the automatic caching of commonly-accessed content by a performance enhancing proxy server (PEP) may obfuscate measurement of transport layer data transfer rate between a remote server and a user equipment (UE) device by causing a cached version of the content to be provided to the UE by the PEP instead of the content being retrieved from the remote server. Additionally, a network's built-in compression may cause a network data transfer rate measurement (i.e., network speed measurement, or network bandwidth measurement) performed with a highly compressible file to differ from a measurement performed with an uncompressible file.

Current methods for measuring network performance are sensitive to content caching and compression. Network performance measurements performed using such methods therefore generally do not accurately reflect the network's overall performance.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a simplified flow diagram showing steps involved in a method for performing network performance measurements using verifiable single-use highly-entropic file generation.

DETAILED DESCRIPTION

Figure 1:
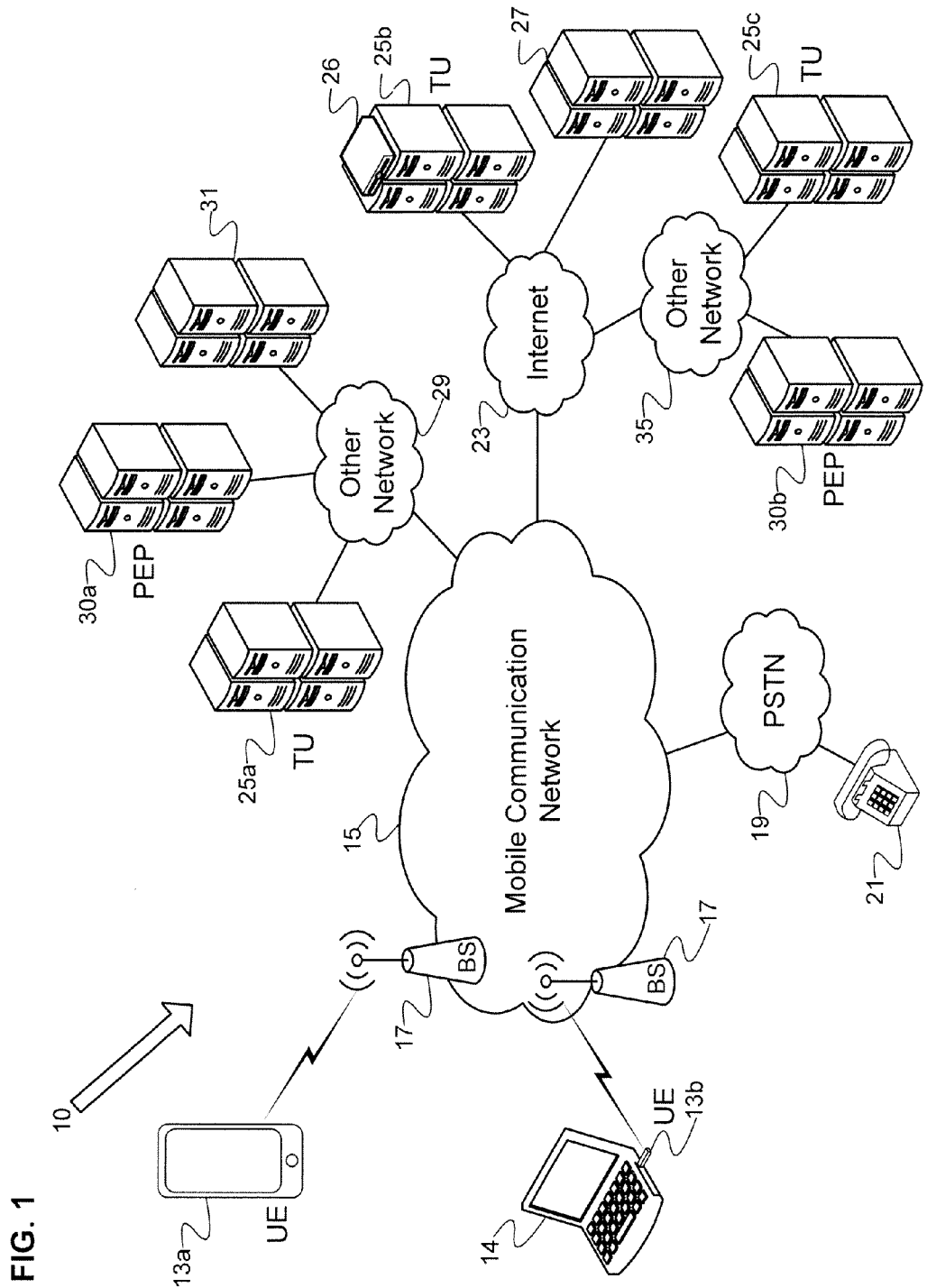
FIG. 1 is a high-level functional block diagram of an example of a system of networks/devices that provide various communications for user equipment (UE) devices and support an example of the network performance measurement technique.

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to providing standardized network performance measurements by generating and transmitting verifiable, single-use, highly-entropic files across a network.

In order to provide network performance measurements, performance measurements across a mobile communication network between a remote server and a user equipment (UE) device are performed using verifiable, single-use, highly-entropic files. A performance measurement begins with a test utility (TU) server receiving a performance measurement query, such as a query transmitted from a UE device. In response to receiving the query, the TU server generates a new highly entropic test file. The test file's entropy ensures that the test file is not highly compressible by standard compression algorithms, such that a compressed version of the test file has approximately the same size as the test file itself. In an example, the test file may be formed of a random or pseudo-random succession of bits. The exemplary test file is a new file with a new filename, such that PEP caching servers in the network will not store previously communicated versions of the test file (or previously communicated versions of a similarly named file). In an example, the test file has a highly variable filename that has not previously been used by the TU server for bandwidth measurement within at least a predetermined period. In another example, the test file has a variable filename that is based, at least in part, on a hash value computed based on the generated test file contents. In another example, the test file has a variable filename that is sufficiently randomized such that the probability that the filename has been previously used within a predetermined period is very low.

Once generated, the test file is transmitted from the TU server to the UE device across the mobile communication network (and any other network(s) in the communication path between the TU server and the UE device). As part of the transmission, one or both of the TU server and the UE device measure the network performance. The network performance metric may be a network data transfer rate metric measured as octets transferred per unit of time, or measured using any other appropriate measure of network speed or network bandwidth.

Upon receipt by the UE device, the integrity of the test file can optionally be verified. In particular, a hash value can be computed for the received file in the UE device and compared to a hash value computed in the TU server for the generated test file (such as a hash value included as part of a filename for the transmitted test file). The result of the comparison of the hash values can be transmitted back to the TU server for logging, and/or a new performance measurement query can be transmitted from the UE device to the TU server in the event that the hash values do not match and that a new performance measurement is desired.

The network performance measurement techniques described herein may enable network users and subscribers to evaluate the performance of mobile network services they are receiving or subscribing to, and to compare the mobile network services they are receiving or subscribing to with mobile network services received by other networks' users and subscribers. The network performance measurements can be initiated from users' own UE devices, and can therefore be used to measure mobile network performance at the time when and the location where the measurement is initiated. Furthermore, the network performance measurement systems described herein can generally be used with UE devices operating on different carriers' mobile networks. As a result, the systems can be used by subscribers of different carrier networks to measure and compare the different carriers' networks' performances. The network performance measurement techniques can further be used by network administrators to measure their own network's performance, for example to monitor the network's performance at different times, in different locations, or following upgrades or adjustments.

Reference now is made in detail to the examples illustrated in the accompanying drawings and discussed below.

FIG. 1 illustrates a system 10 offering a variety of mobile communication services, including communications for measuring the performance of a mobile communication network. The example shows simply two user equipment (UE) devices 13a and 13b configured for communication through a mobile communication network 15. The network 15 provides mobile wireless communications services to those UE devices as well as to other stations and devices (not shown), for example, via a number of base stations (BSs) 17. The present techniques may be implemented in any of a variety of available mobile networks 15 and/or on any type of UE device compatible with such a network 15, and the drawing shows only a very simplified example of a few relevant elements of the network 15 for purposes of discussion here. The UE devices 13a,b are examples of devices that may be used as part of a network performance measurement. However, the network will provide similar communications for many other similar users as well as for mobile stations/devices/users that do not participate in network performance measurements.

The network performance measurement is provided, at least in part, by a test utility (TU) server that generates and transmits a test file, logs information about the transmission, and computes the performance measurement(s). The TU server may be a carrier-operated server, such as server 25a, connected to the communication network 15 (such as a mobile communication network) through private network 29. Alternatively, the TU server may be a carrier-operated or third-party server, such as servers 25b and 25c, connected to the mobile communication network 15 through the Internet 23 and (optionally) through a private network 35. In some examples, multiple TU servers 25a, 25b, and/or 25c (referenced generally herein as TU server(s) 25) can be provided as part of network system 10, such that network performance measurements are performed by any of the multiple servers. In examples with multiple TU servers, one or more load balancers (shown illustratively at 26) can be used to distribute network performance measurement queries across the multitude of TU servers. The load balancer(s) 26 may be stand-alone devices (as shown), or applications running on TU servers or other servers in network system 10. In general, the TU server 25 is selected such that it can handle data transfer rates that are faster than the maximum data transfer rate expected of the communication network under test (e.g., the mobile communication network 15). In some examples, the TU server 25 can handle data transfer rates that are at least 4 times faster than the maximum data transfer rate expected of the communication network under test, so as to ensure that the TU server 25 is not a limiting factor of the performance measurement.

The communication network 15 might be implemented as a wireless mobile communication network conforming to the code division multiple access (CDMA) IS-95 standard, the 3rd Generation Partnership Project 2 (3GPP2) wireless IP network standard, the Evolution Data Optimized (EVDO) standard, the Long Term Evolution (LTE) standard such as 4G LTE, the Global System for Mobile (GSM) communication standard, a time division multiple access (TDMA) standard, or other standards used for public mobile wireless communications. The UE devices 13a,b (referenced generally herein as UE device(s) 13) may be capable of voice telephone communications through the network 15, and for network performance measurements, the exemplary devices 13a,b are capable of data communications through the particular type of network 15 (and the users thereof typically will have subscribed to data service through the network).

The network 15 allows users of the UE devices such as 13a (and other devices, not shown) to initiate and receive telephone calls to each other as well as through the public switched telephone network (PSTN) 19 and telephone stations 21 connected to the PSTN. The network 15 typically offers a variety of data services via the Internet 23, such as downloads, web browsing, email, etc. By way of example, the drawing shows a server 27 connected to the Internet 23; and the data services for the devices 13a,b via the Internet 23 may be with devices like that shown at 27 as well as with a variety of other types of devices or systems capable of data communications through various interconnected networks. The UE devices 13a,b also can receive and execute applications written in various programming languages, as discussed more later.

UE devices 13a can take the form of portable handsets, smart-phones, tablets, or personal digital assistants, although they may be implemented in other form factors. UE devices 13b can take the form of mobile network interface cards that are built in or removably connected to computers 14 or other processing systems, the form of mobile hotspot devices that are wired or wirelessly connected (e.g., using WIFI connections) to computers and other processing systems and configured to provide communication services to connected equipment through the mobile communication network 15, or the like. Program applications, including an application to assist in the network performance measurement service, can be configured to execute on many different types of UE devices 13a and/or 13b, and/or to execute on computers 14 or processing systems connected to UE devices 13a,b. For example, a mobile device application can be written to execute on a binary runtime environment for mobile (BREW-based) mobile device, a Windows Mobile based mobile device, Android device, iOS phone or tablet, Java Mobile, RIM based mobile device such as a BlackBerry, or the like. Alternatively, a device application can be written to execute on a computer 14 connected for communication to network 15 through mobile device 13b. Some of these types of devices can employ a multi-tasking operating system.

The mobile communication network system 10 can be implemented by a number of interconnected networks.

Hence, the overall network system 10 may include a number of radio access networks (RANs), as well as regional ground networks interconnecting a number of RANs and a wide area network (WAN) interconnecting the regional ground networks to core network elements. A regional portion of the network system 10, such as that serving UE devices 13*a,b*, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, a base station 17 can include a base transceiver system (BTS), which can communicate via an antennae system at the site of the base station and over the airlink with one or more of the UE devices 13*a,b* when the UE devices are within range. Each base station can include a BTS coupled to several antennae mounted on a radio tower within a coverage area often referred to as a "cell." The BTS is the part of the radio network that sends and receives RF signals to/from the UE devices 13*a,b* that are served by the base station 17.

The radio access networks can also include a mobile traffic network represented generally by the cloud at 15, which carries the user communications and data for the UE devices 13*a,b* between the base stations 17 and other elements with or through which the UE devices communicate. The network can also include other elements that support functionality such as messaging service messages and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network system 10 and other networks (e.g., the public switched telephone network (PSTN) and the Internet) either directly or indirectly.

The carrier will also operate a number of systems that provide ancillary functions in support of the communications services and/or application services provided through the network system 10, and those elements communicate with other nodes or elements of the network system 10 via one or more private networks 29 (e.g., IP type packet data networks, or Intranets). Generally, such systems are part of or connected for communication via the private network 29. However, systems outside of the private network could serve the same or similar functions as well. Examples of such systems, in this case operated by the network service provider as part of the overall network system 10, which communicate through the intranet type network 29, include one or more TU servers 25*a*, performance enhancing proxy servers (PEPs) 30*a*, and application servers 31 and/or authentication servers.

A UE device 13*a,b* communicates over the air with a base station 17 and through the traffic network 15 for various voice and data communications, e.g. with servers 25*a* and 31 and through the Internet 23 with servers 25*b* and 25*c*. The network system 10 can include one or more PEPs 30*a* operative to perform one or more functions intended to increase the effective data transfer rate experienced by UE devices 13*a,b* when accessing data or services through the network 15, such as data and services to/from the Internet 23. One example of such processing relates to data compression. The PEPs 30*a* can, for example, provide on-the-fly compression of data and communications destined for the UE devices 13*a,b* across the network 15 (e.g., data and communications received from the Internet 23), so as to more efficiently transfer the data in the compressed state to the UE devices 13*a,b*. To more efficiently transfer the data from the UE devices 13*a,b*, data sent in the compressed state goes to the PEPs 30*a*. The PEPs 30*a* can decompress data and communications received from the UE devices 13*a,b* (e.g., data and communications destined for servers 25*b*, 25*c* through the Internet 23). Another example of a function that may be implemented in PEP 30*a* relates to caching. The PEPs 30*a* can cache data and information requested by UE devices 13*a,b* from the Internet 23, so as to directly respond to future requests from UE devices 13*a,b* for the same data without having to repeatedly retrieve the same data or information from the Internet 23.

If the mobile service carrier offers the network performance measurement service, the service may be hosted on a carrier operated test utility (TU) server such as server 25*a*, for communication via the networks 15 and 29. More commonly, however, the service is hosted on an Internet-connected test utility (TU) server such as servers 25*b* and 25*c*, for communication with UE devices 13*a,b* via the networks 15 and 23 (and, optionally, networks 29 and 35). The TU servers 25*a-c* may be carrier-operated servers, or servers provided by a separate entity (alone or through agreements with the carrier). The TU server 25*b* is connected directly to the Internet 23, while TU server 25*c* is connected to the Internet through one or more private or other network(s) 35. Communications to/from the TU servers 25*a-c* may be processed through one or more PEPs 30*a-b*, which may be used to cache or compress requests and data in order to increase the effective data transfer rate experienced by devices requesting data and information from servers 25*a-c*. Communications to/from the TU servers 25*a-c* may further be subject to transport layer conversion, compression, and/or caching during transport through the networks 15, 23, and 35.

Servers such as 25*a-c* may provide any of a variety of common application or service functions in support of or in addition to an application program running on the UE device 13*a,b*. However, for purposes of further discussion, we will focus on functions thereof in support of the network performance measurement service. For a given service, including the network performance measurement service, an application program within the UE device may be considered as a 'client' and the programming on TU servers 25*a-c* may be considered as the 'server' application for the particular service.

The network performance measurement service under consideration here may be delivered to mobile station type UE devices 13*a*, as well as to mobile modem or hotspot type UE devices 13*b*. Hence, our simple example shows the UE device 13*a* as a mobile station type device, and shows the UE device 13*b* as a mobile modem type device. Implementation of the network performance measurement service can involve some execution of programming in the UE device 13*a* and/or in one or both of the UE device 13*b* or a computer 14 or processing system connected to the UE device 13*b*, as well as implementation of data communications through the network 15 to/from the UE devices 13*a,b*.

The network performance measurement service is generally delivered by a TU server, such as servers 25*a-c* described above in relation to FIG. 1. The delivery of the network performance measurement service may involve performance of a series of processing steps on the TU server. FIG. 2 is a simplified flow diagram showing processing steps involved in a method 200 for performing network performance measurements by a TU server using verifiable single-use highly-entropic file generation.

The exemplary method 200 begins in step 201 with the receiving of a network performance measurement query in the TU server. The network performance measurement query is generally received via the mobile communication network 15 from a UE device 13*a,b* having transmitted the request in response to a user input or request. In some examples, however, the query is generated in the TU server, or is received from a server of the network carrier, from a network administrator, or the like. For instance, the TU server may continuously monitor network performance by automatically generating network performance queries on a periodic basis, the automatically generated queries identifying randomly (or pseudo-randomly) selected UE devices.

The network performance measurement query identifies at least one target UE device with respect to which the performance measurement should be performed. The target UE device may be a UE device having transmitted the query and from which the query was received or any other appropriate UE device. The query can, optionally, further include information regarding a preferred test file size and/or a geographic identifier for use in selecting one of a plurality of geographically dispersed TU servers.

In response to receiving the query, the TU server generates in step 203 a test file having high entropy. A file having high entropy is a file such that, when compressed using any common lossless compression algorithm (e.g., a compression algorithm used by a transport layer of one or more communication networks linking the TU server and the UE device, such as a Lempel-Ziv-Stac (LZS) compression algorithm), the compressed file has a file size that is similar to the file size of the uncompressed file. In one example, a high entropy file has a compressed file size that is equal to or larger than the uncompressed file size. In other examples, the high entropy file has a compressed file size that is reduced by no more than 0.1% with respect to the uncompressed file size. In other examples, the size of the high entropy file may be reduced by no more than 1% with respect to the uncompressed file size. A file having high entropy can be generated as a random (i.e., random or pseudo-random) succession of bits, for example.

The test file is a single-use file that is generated in response to a particular measurement query, and is only used for measuring network performance in response to the particular measurement query. Specifically, the test file is generally not used in relation to performing any other measurement queries, and is only transmitted to one particular target UE device identified in the particular measurement query. For example, in response to a network performance measurement query identifying multiple target UE devices, a different test file is generated and transmitted to each identified target UE device.

The test file generated in step 203 may be generated to have a predetermined file size, such as a default test file size. Alternatively, in examples in which the measurement query includes information on a preferred test file size, the test file is generated to have the preferred size.

Once generated, each test file is assigned a filename that includes a variable filename component, in step 205. In general, the variable filename component is a component that has not previously been used within at least a predetermined time period (e.g., a period of one or more days, a period exceeding a time period during which content is cached in a PEP, or the like), or not previously been used in at least a predetermined number of test file transmissions. As a result, each assigned filename is unique or unique among filenames assigned within the at least predetermined time period (or at least predetermined number of transmissions). Alternatively, the variable filename component is generated so as to be sufficiently randomized that the probability of identical filenames being assigned within a predetermined time period (e.g., a period of hours, days, or weeks) is very low (e.g., less than $1/10^n$ where n>3). The randomization of filenames seeks to avoid or minimize the likelihood that a PEP along the test file's transmission path from the TU server to the UE device currently stores a cached file with the same name as the assigned filename.

The filename may be generated using a variety of methods. In some examples, each filename may be a random or pseudo-random filename (e.g., a filename formed of a sequence of random or pseudo-random characters) or a filename including a random or pseudo-random component. In other examples, the filename may be based at least in part on the content of the test file. In one particular example, a hash-value can be computed for the test file (step 205*a*), and the computed hash-value can be used as part of the filename (step 205*b*). A hash-value is a value computed based on the contents of a file using a hash algorithm, and which is designed to change value if the contents of the file change. The hash-value is deterministic (i.e., not random or pseudo-random), meaning that two files with identical contents have the same hash-value.

In step 207, the TU server transmits the test file to the target UE device using the assigned filename. In examples in which two or more target UEs are identified, the TU server transmits a distinct test file (different file content and assigned a distinct filename) to each respective one of the target UE devices. The distinct test files can be transmitted concurrently from the TU server, or transmitted sequentially from the TU server. In one example, the test files are transmitted sequentially in situations in which the TU server has a limited processing capacity and a current processing load of the TU server is at or near the limit of the server's processing capacity. However, in situations in which the current processing load of the TU server is not at or near its limit, the files may be transmitted concurrently. In either case, separate transmission logs and transmission statistics are maintained for each test file.

The test file is transmitted by the TU server through at least the mobile communication network 15 to the target UE device 13*a,b*. In general, however, the test file is transmitted by the TU server through the Internet 23 and/or one or more private networks 35 to the network 15 and the target UE device 13*a,b*. As part of the transport of the test file to the UE device 13*a,b*, the test file may be stored in memory caches of one or more PEPs 30*a,b*, the test file may be compressed, decompressed, encrypted, and/or decrypted by UE devices, PEPs, or other servers, switches, and/or routers along the transmission path to conform to compression and/or encryption standards used by devices/servers/switches/routers and/or the transmission and/or transport layer protocols used along the transmission path.

During the transmission of each test file, the TU server logs transmission information relating to the transmission, in step 209. The log can identify the network performance measurement query received in step 201, and the corresponding test file and test file filename. The log can further store one or more timestamps corresponding to time(s) of transmission of first, intermediate, and last packets (or octets) of the test file from the TU server; time(s) of reception of the packets (or octets) in the target UE device based on time(s) of reception information included in acknowledgment receipt packets sent by the UE device back to the TU server (and, optionally, intermediate transit points along the transmission path of the packets between the TU server and the UE device, if such intermediate transit points send acknowledgment receipt packets back to the TU server); and/or time(s) of reception of acknowledgement packets received from the target UE device at the TU server. In some examples, TUs are configured to capture timestamps along the transmission path by causing at least some of the intermediate transit points along the transmission path to record, in a header of the TU, one or more timestamps indicative of the time of reception of the TU in the intermediate transit point. In addition to time of reception timestamps, the TU header can record other packet data unit (PDU) information, a timestamp corresponding to a predicted time of transmission from the intermediate transit point, or the like. TUs having captured timestamps along the path are further configured to cause the target UE device, upon receiving the TU, to transmit back to the TU server the captured timestamp information for inclusion in the log of transmission information.

Once the transmission of the test file is complete (e.g., once the target UE device confirms receipt of the entire test file), one or more network performance measurement values can be computed, in step 211. Each measurement value is generally computed in the TU server based on the logged information corresponding to the test file. Alternatively, measurement values can be computed in the UE device or at any other appropriate location in the performance measurement system 10.

For example, a data transfer rate for the transport of the test file from the TU server to the UE device can be computed. The data transfer rate may be an overall data transfer rate calculated as a ratio of the total octets of information transmitted as part of the test file transmission (e.g., a test file size), divided by the total time taken to transfer or transport the test file. The total time taken to transfer or transport the test file can be measured in the TU server, for example as the difference between times of transmission of first and last packets (or first and last octets) of the test file from the TU server, or as the difference between a time of initiating the performance measurement in the TU server (e.g., a time of opening a communication session with the UE for performing the measurement) and a time of completing the performance measurement in the TU server (e.g., a time of closing the communication session with the UE used for performing the measurement). The total time taken to transfer or transport the test file can alternatively (or additionally) be measured in the UE, for example as the difference between times of reception of first and last packets (or first and last octets) of the test file in the target UE, or as the difference between a time of initiating a performance measurement in the UE (e.g., a time of sending a request for the test file from the UE to the TU server) and a time of completing the performance measurement in the UE (e.g., a time of receiving a last packet or octet of the test file). Data packet transfer rates can additionally be calculated for each transmitted packet of the test file, and maximum, minimum, and average packet data transfer rates can be computed. In examples in which timestamps are obtained from intermediate transit points along a TU's transmission path, transfer rates can additionally be calculated for individual segments along the path.

Once the measurement value is computed, the TU server can generate and transmit a message including the measurement value to the device from which the performance measurement query was received (and/or to a different designated device). For example, the measurement value can be transmitted back to a UE device from which the performance measurement query was received, to inform a user of the UE device of the measurement value.

The method 200 can optionally include test file verification steps, notably in situations in which the TU server has computed a hash-value corresponding to the generated test file. In such situations, the UE device computes a hash-value corresponding to the received version of the test file upon receipt of the test file on the target UE device and uses the computed hash-value to ensure the received file is correct and complete.

In particular, the UE device can compare the computed hash-value for the received version of the test file with the hash-value computed by the TU server for the generated test file (e.g., the hash-value computed by the TU server in step 205a and included in the transmitted test file's filename in step 205b), to determine whether the two hash-values match and transmit to the TU server hash-value information relating to the match (step 210a). Alternatively, the UE device can transmit the computed hash-value for the received version of the test file to the TU server as the hash-value information (step 210a) such that the TU server can compare the hash-values and determine the presence (or not) of a match. In response to receiving the hash-value information, the TU server determines whether a new network performance measurement should be performed (step 210b). If the hash-values do not match, a new measurement can be performed by returning to step 203 to generate a new test file. However, if the hash-values match, the network performance measurement can be completed by proceeding to step 211.

Figure 3A:
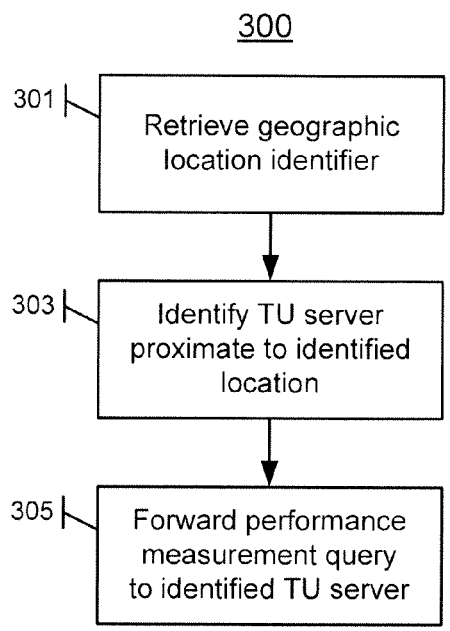
FIGS. 3A-3C are simplified flow diagrams showing steps involved in methods for identifying test utility (TU) servers for performing network performance measurements.
Figure 3B:
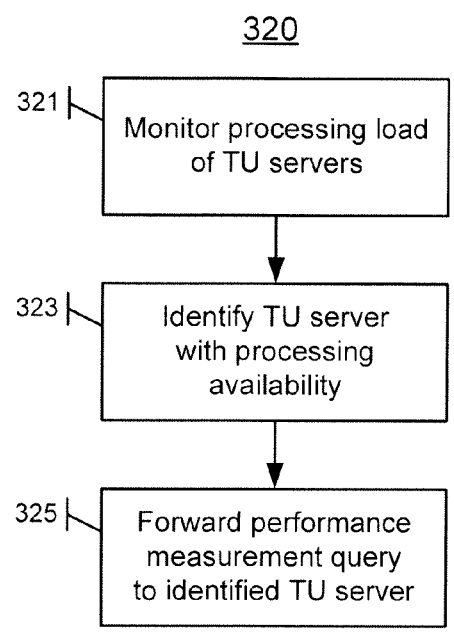
Figure 3C:
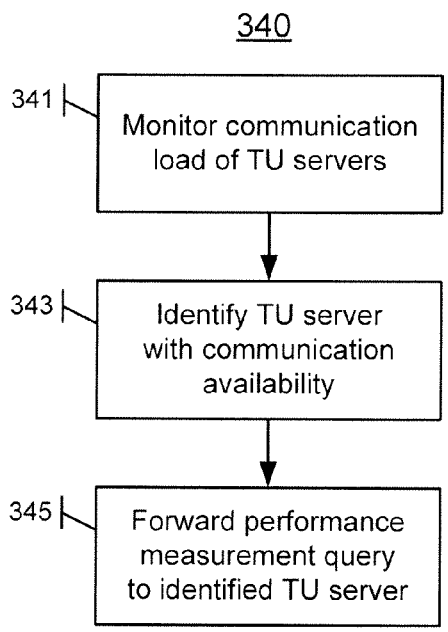

FIGS. 3A-3C are flow diagrams detailing steps involved in various method for selecting a TU server, among a plurality of TU servers, for performing network performance measurements (such as by performing the steps of method 200).

As shown in FIG. 3A, the method 300 enables a TU server, among the plurality of TU servers, to be selected based on geographic location. In accordance with the method 300, TU servers are geographically distributed at known locations across a geographical area. In response to receiving the network performance measurement query, a determination is made to identify to which TU server the query should be directed. The method 300 can be performed by a TU server having received the query and/or by a load balancer 26 charged with distributing network performance measurement queries across the plurality of TU servers. The load balancer 26 may be an application running on a TU server, or a separate or stand-alone load balancer device (as shown in FIG. 1).

In step 301, a geographic location identifier associated with the received network performance measurement query is retrieved. The geographic location identifier may be a parameter included as part of the query, such as a user inputted parameter identifying a location of the target UE device or identifying a desired location of the TU server to be used. The geographical location identifier may alternatively be automatically provided in the query, for example by GPS circuitry on the UE device. The geographic location identifier may also be retrieved from a home location register (or visitor location register) storing mobile network connectivity information for the target UE device indicative of the target UE's location.

Based on the retrieved geographic location identifier, one of the plurality of TU servers is identified, in step 303. In particular, a TU server that is proximate to (or closest to) the retrieved location can be identified. The TU server can be identified based at least in part on the location identifier of the query and on location information for each of the TU servers of the plurality.

In step 305, the performance measurement query is forwarded or redirected to the identified TU server for further processing. In response to the performance measurement query being forwarded to the identified TU server, the identified TU server can perform the steps 201-211 of method 200.

As shown in FIGS. 3B and 3C, the methods 320 and 340 enable a TU server, among the plurality of TU servers, to be selected based on resource availability. In general, the methods 320 and 340 may be performed by a stand-alone load balancer in response to receiving a network performance measurement query. In some examples, the methods 320 and 340 are performed by a load balancer application that forms part of a TU server in response to receiving the network performance measurement query.

In accordance with the method 320, the load balancer monitors the processing load of all TU servers of the plurality in step 321. In order to monitor the processing load, the load balancer periodically receives status messages from the TU servers including information about the servers' processing load. The load balancer may periodically request status information from the TU servers or automatically receive the information from the servers. Alternatively, the load balancer may monitor the number of queries sent to each TU server (and/or the file size indicated in each query) and estimate the processing load of each TU server based on the number (and/or file size) of queries sent to each TU server within a predetermined time period (e.g., the last 5 s time period).

In response to receiving a network performance measurement query, the load balancer identifies a TU server with processing availability to perform the measurement in step 323. A TU server may be determined to have processing availability if the processor's current processing load does not exceed a predetermined processing load threshold. The threshold may be expressed in terms of a central processing unit (CPU) availability measure, a number of measurement queries currently being performed, a cumulative size of test files associated with measurement queries currently being performed, or the like. The load balancer forwards or redirects the performance measurement query to the TU server identified as having availability in step 325 so as to cause the identified TU server to perform the steps of method 200.

In accordance with the method 340, the load balancer monitors the communication load of all TU servers of the plurality in step 341. In order to monitor the communication load, the load balancer may periodically receive status messages from the TU servers including information about the servers' communication load. Alternatively, the load balancer may monitor the number of queries sent to each TU server (and/or the file size indicated in each query), and estimate the communication load of each TU server based on the number (and/or file size) of queries sent to each TU server within a predetermined time period.

In response to receiving a network performance measurement query, the load balancer identifies a TU server with communication availability to perform the measurement in step 343. A TU server may be determined to have communication availability if the processor's current communication load does not exceed a predetermined communication load threshold. The threshold may be expressed in terms of a current data transfer rate measure, a ratio of a current data transfer rate to a maximum data transfer rate supported by the TU server and/or supported by communication links available to the TU server, a number of measurement queries currently being performed, a cumulative size of test files associated with measurement queries currently being performed, or the like.

Once a TU server with communication availability is identified, the load balancer causes the identified TU server to perform at least step 207 of method 200 in step 345. The remaining steps of method 200 (i.e., steps 201, 203, 205, 209, and 211) may be performed by the identified TU server, or by another appropriate TU server of the plurality. In one example, the load balancer redirects the performance measurement query to the identified TU server, so as to cause the identified TU server to perform step 207 and, optionally, the remaining steps of method 200.

Figures 4A, 4B:
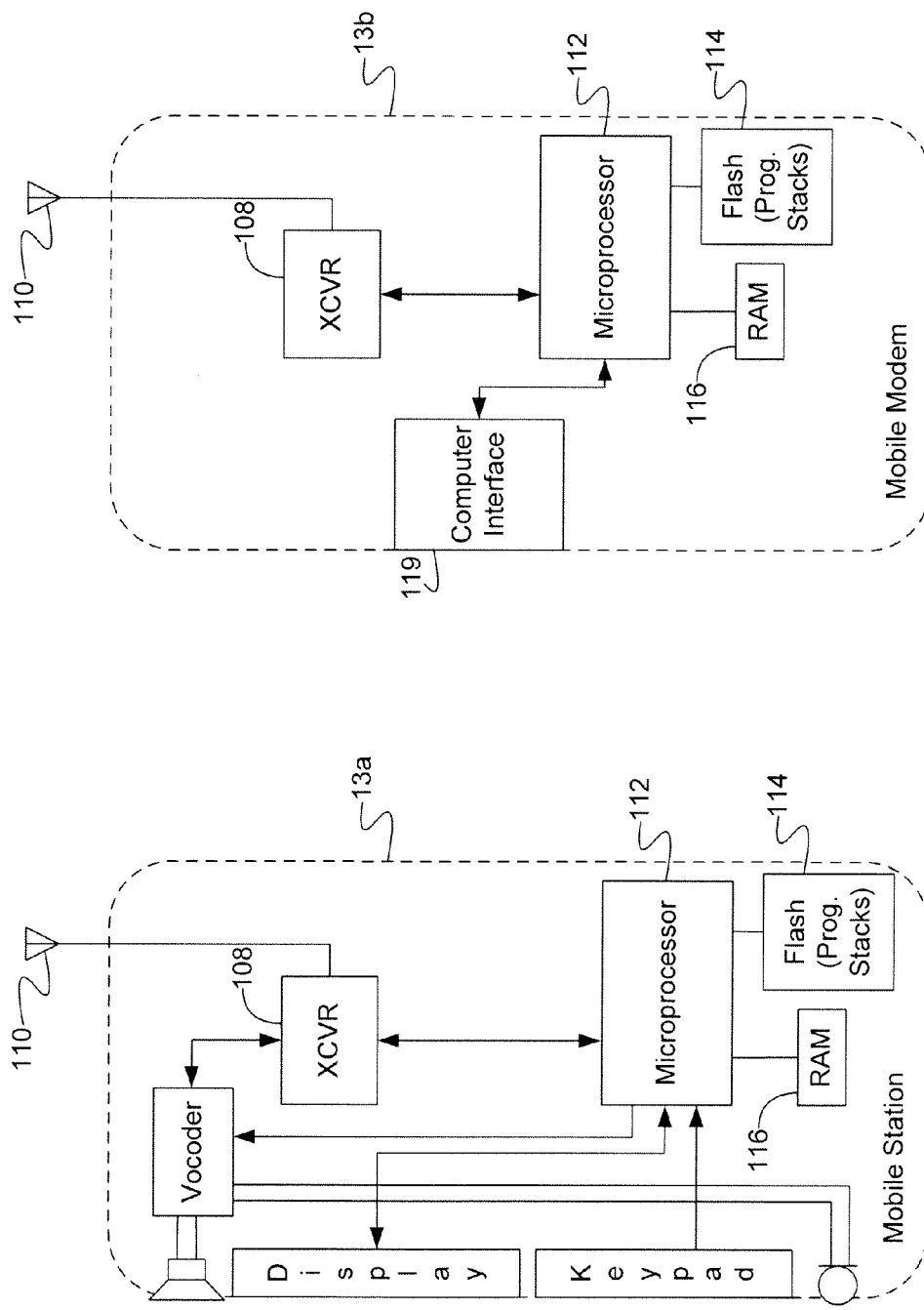
FIGS. 4A and 4B are high-level functional block diagrams of exemplary UE devices as may utilize the network performance measurement technique through a network/system like that shown in FIG. 1.

FIG. 4A provides a block diagram illustration of an exemplary mobile station type UE device 13a. Although the UE device 13a may be a smart-phone or may be incorporated into another device, such as a personal digital assistant (PDA) or the like, for discussion purposes, the illustration shows the UE device 13a in the form of a handset. The handset embodiment of the UE device 13a functions as a normal wireless telephone station.

FIG. 4B provides a block diagram illustration of an exemplary mobile modem type UE device 13b. The UE device 13a may be a mobile hotspot, an air card, or any other mobile communication network interface card for enabling a computer or other processing circuitry to connect to and communication across a mobile communication network.

For digital wireless communications, the devices 13a and 13b each include at least one digital transceiver (XCVR) 108. Today, the devices 13a and 13b would be configured for digital wireless communications using one or more of the common network technology types. The concepts discussed here encompass embodiments of the devices 13a and 13b utilizing any digital transceivers that conform to current or future developed digital wireless communication standards. The devices 13a and 13b may also be capable of analog operation via a legacy network technology.

The transceiver 108 provides two-way wireless communication of information, such as digital information, in accordance with the technology of the network 15. The transceiver 108 also sends and receives a variety of signaling messages in support of the various voice and data services provided via the devices 13a,b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

In addition to normal telephone and data communication related input/output (including message input and message display functions), the UE devices 13a and 13b also may be used for initiating and/or performing network performance measurements. Network performance measurement queries can be generated and transmitted from the UE devices to various TU servers associated with the mobile communication network 15, for example in response to user input on a keypad of device 13a and/or user input on a computer 14 or other processing system connected to device 13b through computer interface 119 for communication on mobile communication network 15. The network performance measurement queries may be generated in a web browser, for example by accessing a particular website or web-based application, or in a dedicated application running on the device 13a,b or connected computer 14.

A microprocessor 112 serves as a programmable controller for the UE devices 13a,b, in that it controls all operations of the devices in accord with programming that it executes, for all normal operations, and for operations involved in the measurement of network performance procedures under consideration here. In the example, the UE devices 13a,b include flash type program memory 114, for storage of various "software" or "firmware" program routines and mobile configuration settings, such as mobile directory number (MDN) and/or mobile identification number (MIN), etc. The UE devices 13a,b may also include non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and control software, and any of a wide variety of other applications. Programming stored in the flash type program memory 114, sometimes referred to as "firmware," is loaded into and executed by the microprocessor 112.

As outlined above, the UE devices 13a,b each include a processor, and programming stored in the flash memory 114 configures the processor so that the device is capable of performing various desired functions, including in this case the functions involved in the technique for measuring network performance. In particular, the devices can be used to generate network performance measurement queries, and to transmit such queries to TU servers of the network system 10. The devices 13a,b can further be used to receive test files from TU servers, and to report back to the TU servers transmitting the test files log information relating to the transport of the files through the communication network(s). The log information can include acknowledgment receipt messages transmitted in response to receiving the test files (or packets thereof), timestamps of receipt of the test files (or packets thereof), information on jitter or delay experienced in the receipt of the test files, or the like. The devices 13a,b can further be used to compute a hash-value corresponding to a received version of a test file, to compare the computed hash-value to a hash-value received from the TU server (e.g., a hash-value included as part of a filename of the received test file), and to transmit to the TU server the computed hash value and/or results of the comparison. The UE devices 13a,b may store and execute one or more dedicated application for generating the network performance measurement query and performing steps relating to network performance measurement, of the UE devices 13a,b generate the query and perform steps relating to the measurement by executing a web browser or other general purpose application (e.g., a web browser running an applet for network performance measurement).

As shown by the above discussion, functions relating to the network performance measurement service may be implemented on computers connected for data communication via the components of a packet data network, such as computers operating as TU servers 25a-c shown in FIG. 1. Although special purpose devices may be used, such devices also may be implemented using one or more hardware platforms intended to represent a general class of data processing device commonly used to run "server" programming so as to implement the network performance measurement functions discussed above, albeit with an appropriate network connection for data communication. The TU servers 25a-c may be stand-alone or dedicated physical servers for performing network performance measurements. More generally, however, the TU servers 25a-c may correspond to server applications running on general purpose servers used to provide network performance measurement and other network services.

Figures 5, 6:
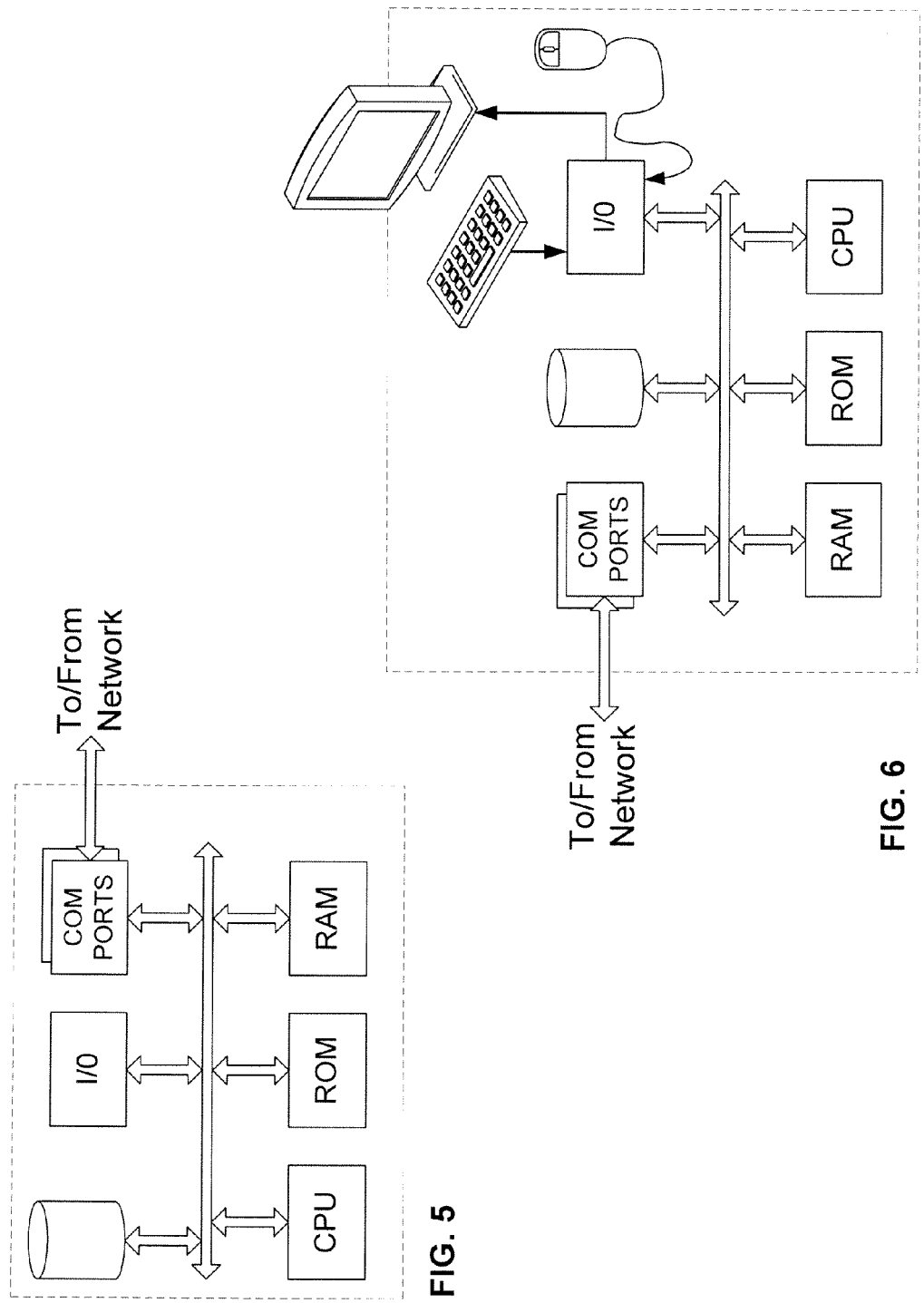
FIG. 5 is a simplified functional block diagram of a computer that may be configured as a host or server, for example to function as the TU server in the system of FIG. 1.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a TU server. FIG. 6 depicts a computer with user interface elements, as may be used to implement a personal computer 14 or other type of work station or terminal device, although the computer of FIG. 6 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. Of course, the server functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
in response to receiving in a test utility (TU) server a network performance measurement query identifying a user equipment (UE) device communicating through a mobile communication network, generating a test file having high entropy;
assigning to the test file a filename comprising a variable filename component, the variable filename component designed to minimize a likelihood that a performance enhancing proxy server (PEP server) along a transmission path between the TU server and the UE device stores a file having the assigned filename of the test file;
transmitting the high-entropy test file from the TU server to the UE device using the assigned filename;
logging information relating to the transmission of the high-entropy test file on the TU server; and
computing a network performance measurement value for transport of the high-entropy test file from the TU server through at least the mobile communication network to the UE device based on the logged information.

2. The method of claim 1, wherein the generating of the test file having high entropy comprises generating the test file as a random or pseudo-random succession of bits.

3. The method of claim 1, wherein the assigning of the filename comprises:
computing a hash value corresponding to the generated test file,
wherein the variable filename component comprises the computed hash value.

4. The method of claim 3, further comprising:
receiving from the UE device an indication of whether a hash value computed based on a version of the test file received at the UE device matches the computed hash value included in the filename of the transmitted test file.

5. The method of claim 3, wherein the variable filename component of the filename is further designed to not have been previously used within a predetermined time period that exceeds a time period during which files are stored in the memory cache of the PEP server.

6. The method of claim 3, wherein the variable filename component of the filename is further designed to not have been previously used within a predetermined number of test file transmissions from the from the TU server to a plurality of UE devices.

7. The method of claim 1, wherein the generating of the test file having high entropy comprises generating the test file such that, when compressed using any compression algorithm used by a transport layer of one or more communication networks linking the TU server and the UE device, the compressed test file has a file size that is reduced by no more than 1%.

8. The method of claim 1, wherein the network performance measurement value is a data transfer rate measurement value computed as a ratio of a test file size to a total time taken to transfer the test file from the TU server to the UE device.

9. The method of claim 1, wherein:
the network performance measurement query includes an indication of a file size, and
the generating of the test file comprises generating of the test file having high entropy and having the indicated file size.

10. The method of claim 1, wherein:
the network performance measurement query includes an indication of a geographic location for the TU server;
the method further comprises identifying one TU server, from among a plurality of TU servers located in different geographical locations, that is located nearest the indicated geographic location;
the transmitting of the high-entropy test file comprises transmitting the test file from the identified TU server through at least the mobile communication network to the UE device; and
the computing of the network performance measurement value comprises computing the network performance measurement value for the transmission of the high-entropy test file from the identified TU server to the UE device.

11. The method of claim 1, wherein:
the network performance measurement query is received by a load balancer configured to monitor at least one of the processing load and the communication load of each of a plurality of TU servers;
the method further comprises identifying one TU server from among the plurality of TU servers that has a processing load or a communication load not exceeding a processing or communication load threshold; and
the method further comprises redirecting the network performance measurement query from the load balancer to the identified TU server to cause the identified TU server to perform each of the generating, assigning, transmitting, logging, and computing steps.

12. The method of claim 1, wherein the transmitting of the test file comprises transmitting the test file from the TU server to the UE device through at least the mobile communication network and one public packet data network.

13. A system comprising:
a test utility (TU) server for computing network performance measurement values based on transmissions of test files to user equipment (UE) devices, the TU server comprising:
a processing unit;
a data communication interface for communication with a UE device coupled to a mobile communication network; and
instructions for execution by the processing unit for causing the processing unit to perform functions including functions to:
in response to receiving a network performance measurement query identifying the UE device communicating through the mobile communication network, generate a test file having high entropy;
assign to the test file a filename comprising a variable filename component, the variable filename component designed to minimize a likelihood that a performance enhancing proxy server (PEP server) along a transmission path between the TU server and the UE device stores a file having the assigned filename of the test file;
transmit the high-entropy test file using the data communication interface to the UE device using the assigned filename;
log information relating to the transmission of the high-entropy test file; and
compute a network performance measurement value for transport of the high-entropy test file through at least the mobile communication network to the UE device based on the logged information.

14. The system of claim 13, wherein the generating of the test file having high entropy comprises generating the test file as a random or pseudo-random succession of bits.

15. The system of claim 13, wherein the assigning of the filename comprises:
computing a hash value corresponding to the generated test file,
wherein the variable filename component comprises the computed hash value.

16. The system of claim 15, further comprising:
receiving from the UE device an indication of whether a hash value computed based on a version of the test file received at the UE device matches the computed hash value included in the filename of the transmitted test file.

17. The system of claim 13, wherein the generating of the test file having high entropy comprises generating the test file such that, when compressed using any compression algorithm used by a transport layer of one or more communication networks linking the TU server and the UE device, the compressed test file has a file size that is reduced by no more than 1%.

18. The system of claim 13, wherein the network performance measurement value is a data transfer rate measurement value computed as a ratio of a test file size to a total time taken to transfer the test file from the TU server to the UE device.

19. The system of claim 13, wherein:
the network performance measurement query includes an indication of a file size, and
the generating of the test file comprises generating of the test file having high entropy and having the indicated file size.

20. The system of claim 13, further comprising:
a second TU server, wherein the TU server and the second TU server form part of a plurality of TU servers located in different geographical locations; and
a load-balancer for distributing network performance measurement queries across the plurality of TU servers,
wherein:
the network performance measurement query includes an indication of a geographic location, and
the load balancer is configured to:
identify one TU server, from among the plurality of TU servers, that is located nearest the indicated geographic location; and
redirect the network performance measurement query to the identified TU server to cause the identified TU server to generate and transmit the test file through at least the mobile communication network to the UE device and compute the network performance measurement value for the transport of the test file from the identified TU server to the UE device.

21. The system of claim 13, further comprising:
a second TU server, wherein the TU server and the second TU server form part of a plurality of TU servers; and
a load balancer for distributing network performance measurement queries across the plurality of TU servers,
wherein the load balancer is configured to:
monitor at least one of the processing load and the communication load of each of the plurality of TU servers;
identify one TU server from among the plurality of TU servers that has a processing load or a communication load not exceeding a processing or communication load threshold; and
redirect the network performance measurement query to the identified TU server to cause the identified TU server to generate and transmit the test file through at least the mobile communication network to the UE device and compute the network performance measurement value for the transport of the test file from the identified TU server to the UE device.

22. The system of claim 13, wherein the transmitting of the test file comprises transmitting the test file from the TU server to the UE device through at least the mobile communication network and one public packet data network.

* * * * *